Jan. 9, 1962     T. H. BRIGGS ET AL     3,016,489

TEST JIG FOR CONTACTING CIRCUIT CARD POSITIONS

Filed July 17, 1959

*INVENTORS*
THOMAS H. BRIGGS
EDWIN A. HOLLENBACH

BY *Lawrence R. Brown*

United States Patent Office 3,016,489
Patented Jan. 9, 1962

3,016,489
TEST JIG FOR CONTACTING CIRCUIT CARD POSITIONS
Thomas H. Briggs, Malvern, and Edwin A. Hollenbach, Broomall, Pa., assignors, by mesne assignments, to Drexel Dynamics Corporation, Philadelphia, Pa., a corporation of Pennsylvania
Filed July 17, 1959, Ser. No. 827,913
9 Claims. (Cl. 324—158)

This invention relates to test equipment for automatically determining the characteristics of wired circuit cards used in electronic apparatus and more particularly it relates to test jigs for use in making electrical test measurements at any circuit connecting position upon an electronic circuit card or board assembly.

It has become necessary in the electronic art to employ automatic circuit checkout equipment for checking the construction of electronic circuit assemblies, such as printed circuits, mounted on circuit cards or boards. In the prior art the circuit card has been provided with a plug connector portion at which measurements are made. In general circuit connections at the plug connector do not provide the proper circuit positions for checking independently some of the individual components mounted on the card or board. Thus, for prior art test methods automatic card checking equipment must be quite sensitive and complex to determine errors in wiring or failures in components.

It is therefore a general object of this invention to overcome the above and other like deficiencies of prior art equipment and to provide an improved test jig for automatic test equipment which may contact any circuit connection point upon an electronic circuit card or board assembly.

Assume that a standard card layout is provided with all circuit connection intersections or junctions laid out at a position falling on one coordinate of a matrix grid pattern having one-tenth inch centers between adjacent coordinate positions. That is, each one-tenth inch coordinate position in two planar dimensions on the face of the card defines one potential connection point for one or more components upon the circuit card. A circuit connection jig therefore must have the capabilities of communicating with any one of many finely spaced coordinate positions upon the circuit card in order to isolate all desirable test points for independent connection.

It is therefore an object of the invention to provide a test jig which can provide test positions for a plurality of closely positioned circuit connection coordinates on a wired circuit card or the like for electronic apparatus.

If critical circuits are tested, involving low resistance paths such as encountered in transistor circuits, the contacts provided by the test jig must make positive-acting low-resistance circuit connections that do not damage the existing card or wiring. This is a difficult criterion to meet considering that access to a large number of points is necessary to cover the total number of possible points and even a nominal spring contact pressure on each point when multiplied by a myriad of points will cause a large overall force tending to bend or damage a circuit card. In addition different wire sizes or solder joint thicknesses may occur at the test positions causing uneven pressures or travel distances upon different test probe positions. The size of the actual probe element limits the effectiveness and complexity of the probe mechanism that may be tolerated.

It is thus another object of the invention to provide positive low-resistance test probe means capable of selecting and connecting with any one of a number of very closely spaced points upon a circuit card or board under test with uniform contact pressures.

A further object of the invention is to provide an improved testing station for the selection of and contact with various circuit connection positions upon a circuit card or board assembly.

In accordance with the invention there is provided a jig assembly for connecting a plurality of test probes or probe elements to selected test points upon a circuit card or board under test. The number of test points or positions may be laid out on the card depending upon the circuit configuration to be tested, but each potential test position must be capable of selection even when dimensions become as fine as one-tenth inch or less between adjacent circuit points. In at least those coordinate positions defining the circuit test points selected are positioned electrical test probes or probe assemblies as will hereinafter appear. These probes or probe assemblies have circuit connection means such as small area chisel-edged connector points adapted for forcing into the circuit card connection points to permit low ohmic contact through oxide surfaces or resin coatings if they exist.

Each connector point has a lead integrally connected by soldering or welding so that connection to a test circuit terminal board may be made thereby without errors in testing due to combinations of ohmic resistances. A matrix assembly having a grid array of receptacle apertures receives simple round peg or pin portions of the probe assemblies at the designated coordinate positions corresponding to said card connection points, for example at one-tenth inch centers in a matrix plate along both the abscissa and the ordinate. Each peg is typically a cylindrical plunger or pin section of about one-twelfth inch in diameter which slidably fits into a matrix receptacle well. The matrix grid array plate receiving the peg have enough thickness to receive a substantial length of the peg, thereby providing support to the connector point and permitting enough motion for forced contact with the circuit connections on a circuit card mounted near to and parallel with the matrix grid array plate.

To produce constant firm and equalized pressure upon all probe connector points, the pegs extend through the matrix plate and are firmly forced into constant pressure contact by a unitary flexible diaphragm means, which may be put under air or other fluid pressure to permit release of the forced contact when replacing circuit cards.

Although probe assemblies may be provided at all positions, most test conditions require a relatively sparse dispersal of test points about the many possible card coordinate points because of the relatively large size of component parts mounted thereon. Thus, only a few connector probes or probe assemblies need be employed and the resulting force on the card is thereby minimized. It is recognized that with the diaphragm action, only enough maximum longitudinal probe point motion into the card need be afforded to assure that contact is made to extreme positions on the card connection or circuit junction points such as provided at either a flush printed circuit wire or a component mounting station.

Thus a simple positive action jig permits simplified circuit test equipment to be employed for automatic circuit analysis of electronic cards.

The foregoing objects of the invention together with further features and advantages will be best understood by reference to the drawing, wherein.

Figure 1:
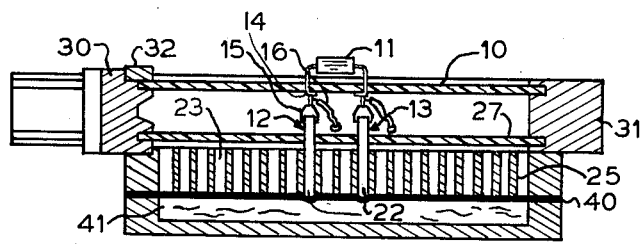
FIGURE 1 is a sectioned elevation view of a circuit card and a test jig assembly therefor constructed in accordance with the invention.
Figure 2:
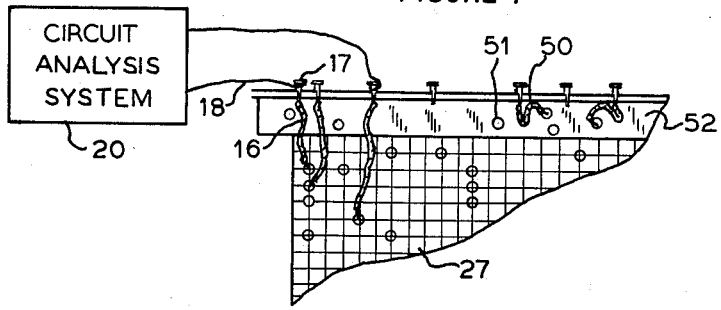
FIGURE 2 is a partial plan view of a portion of the apparatus of FIGURE 1 including a test probe array for the circuit card with leads connected into a test circuit indicated in block diagram form.
Figure 3:
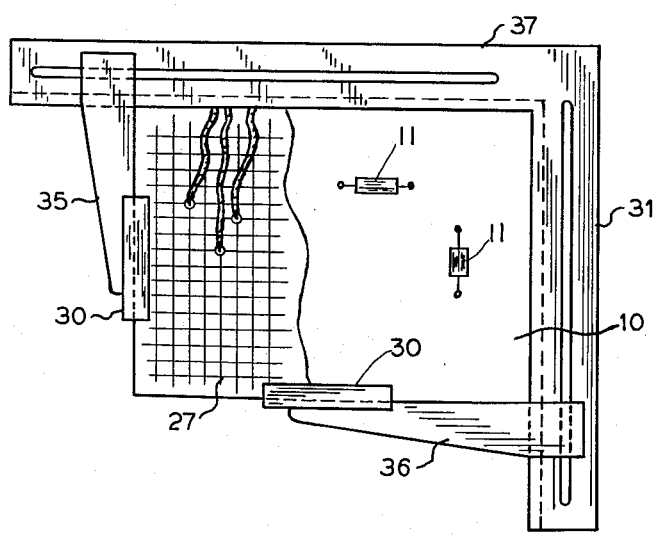
FIGURE 3 is a plan view of the jig assembly of FIG- URE 1 including a portion of the circuit card mounted in test position.

Referring now to the test jig assembly as shown in the various figures of the drawing, it is seen that a printed circuit board or card 10 is mounted so that components 11 may be connected for testing by means of suitably-positioned probe assemblies 12 and 13. Each probe assembly has a circuit connector point or tip 14 with a chisel edge configuration for firmly contacting the leads or printed circuit conductors on the lower side of the card such as shown at each end of a component 11. A metallic conducting cap 15 on each probe assembly holds the tip 14 and is connected to a flexible external circuit lead 16 by a soldered or welded connection to prevent any further series ohmic contact resistance other than at the connection point as would be produced should a spring connector device or the like be used. The lead 16 is soldered or otherwise connected to an external test circuit terminal 17 to which is also connected a test lead 18 coupled to a circuit analysis system 20. This, and a similar connection for the other side of the test system 20, confines the ohmic drop to the single connection between the probe and component or circuit card connection point in the circuit analysis system, thereby permitting precise measurement of even low conduction paths to very close tolerances.

As may be seen, individual peg-like plungers or pins 22 extending the probe assembly into as appropriate matrix aperture receptacle well 23 may be inserted where desired for defining the circuits under test to be coupled to the circuit analysis system. The pegs may be made from Teflon or nylon for example, and the matrix apertured assembly plate 25 may be a drilled steel sheet.

An insulating perforated template 27 having the same grid pattern of spaced apertures or openings is placed over or aligned with the matrix assembly and is marked at appropriate openings which define the positions for inserting probe assemblies for the particular card under test. Both the circuit card 10 and the template 27 are clamped into place by mounting channels 30 and 31. Each circuit card may be readily removed and replaced by first removing a top mounting channel molding clamp 32, which holds down the circuit card in test position. Bracket assemblies 35 and 36, together with mounting channels 31 and 37, hold the card 10 and template 27 in place in registration with the matrix plate 25. Adjustments may be made to hold various size cards.

To force the connector points into firm contact with the circuit card and with constant pressure, even when different thrust distances are encountered, a flexible diaphragm element 40 is employed to contact the pin or peg portion of each test probe assembly extending through the aperture wells. The diaphragm pressure may be supplied by air or hydraulic pressure in a chamber 41 which is suitably controlled to permit lessening of the contact force during replacement of the card.

Unused circuit probe assemblies 50 may be pegged into appropriate retaining apertures 51 around the edge of the matrix plate 25 in the rack member 52.

What is claimed is:

1. A test jig assembly for contacting individual circuit connection points on an electronic circuit card or board, comprising in combination, a plurality of test probe assemblies, each having a connecting point and a mounting peg, a plate having an array of aperture receptacles for receiving and positioning the mounting pegs of the test probe assemblies with the connecting point on one side and a portion of the mounting peg extending on the other side of the plate, a flexible diaphragm element contacting on one side thereof all of the extending portions of the mounting pegs, and means for applying fluid pressure to said diaphragm uniformly on the opposite side thereof thereby to apply the same pressure to each peg in the direction of the connecting points to effect firm contact thereof with selected ones of said circuit connection points.

2. In a test jig assembly, a plurality of test probes, means providing a test circuit structure having test connection points arranged in a grid pattern, means movably holding the test probes at selected points in said pattern, flexible fluid-pressure-operated diaphragm means contacting the test probes at selected points in said pattern and movable as a unitary driver to force said probes into engagement with certain of the test circuit connection points with equalized pressure.

3. In a printed-circuit test apparatus, the combination of, a multiple-apertured plate, a template structure defining certain apertures in the plate, a plurality of test probes mounted in the defined apertures, each test probe comprising a peg section fitted with a conductive cap embracing a connector point, a flexible fluid-pressure-operated diaphragm uniformly contacting the peg sections of said test probes and providing unitary means for applying equalized pressure thereto, and a circuit test card positioned thereon to present test circuits to the connector points at positions for producing equalized contact pressure by force of said unitary diaphragm means.

4. A test probe assembly for use in a multiple probe jig circuit test system, comprising in combination, a plurality of plastic pegs, each plastic peg fitted with a conductive cap embracing a connector point and a circuit lead wire having a first test-circuit terminal, a matrix assembly having a grid array of receptacle apertures for receiving and holding said plastic pegs in selected test positions, flexible fluid-pressure diaphragm means positioned for engaging and driving said pegs uniformly, each in the direction of the connector point associated therewith with the same equalized pressure, and means for receiving and holding an electronic circuit board having circuit connection points thereon with said circuit connection points in alignment with certain of said receptacle apertures and the connector points of the plastic pegs located therein.

5. A test system for electronic circuit boards and the like, comprising in combination, circuit testing means, a pair of conductive test probes, circuit means connected between the test probes and the testing circuit means providing a continuously integral conducting path, means for holding the test probes for motion along parallel axes in the same direction, and flexible fluid-pressure-operated diaphragm means connected with the probes to forcibly urge them with equalized pressure along said direction of motion into test connection with a circuit board or the like to be tested.

6. A test system as defined in claim 5 including pressure chamber means for operating said diaphragm means.

7. A test system as defined in claim 5 including apertured template means for defining the location at which the probes are positioned.

8. An electrical test jig assembly for a printed-circuit board or card having components and circuit conductors thereon with selected test points on the conductors positioned in a predetermined grid pattern, comprising in combination, a plurality of test probe assemblies having connector points adapted to contact said conductors at said selected test points and having conducting caps connected with said connector points, a flexible lead connected between each of said conducting caps and a fixed test terminal therefor, a plurality of insulated pegs attached one to each of said conducting caps and associated connector point, a matrix assembly plate having a plurality of apertures for receiving and holding said pegs in parallel relation for motion with respect to said test points, said apertures being positioned in the grid pattern corresponding to said selected test points, a flexible fluid-pressure-operated diaphragm for contacting and moving said pegs with equalized pressure in the direction of said test points to bring the connector points into engagement therewith, and an insulated perforated template having the same grid pattern of openings therethrough aligned with the matrix assembly to define selectable positions for locating said pegs and the connector points carried thereby.

9. An electrical test jig assembly for a printed-circuit board having components and circuit conductors thereon with selected test points on the conductors positioned in a predetermined grid pattern, comprising in combination, a plurality of test probe assemblies having connector points adapted to contact said conductors at said selected test points, means providing a test terminal connection with each of said connector points, a plurality of insulated pegs connected one with each of said connector points, a matrix plate having a plurality of apertures for receiving and holding said pegs in substantially parallel relation for motion with respect to said test points, said apertures being positioned in the grid pattern corresponding to and in registration with said selected test points, said circuit board being mounted near and in parallel relation to said matrix plate, a flexible fluid-pressure-operated diaphragm for contacting and moving said pegs with equalized pressure in the direction of said test points to bring the connector points into engagement therewith, an insulated perforated template having the same grid pattern of openings therethrough aligned and in registration with the matrix plate to define selectable positions for locating said pegs and the connector points carried thereby, and means for releasably holding said board and template in place in registration with said matrix plate.

References Cited in the file of this patent

UNITED STATES PATENTS

| | | |
|---|---|---|
| 2,137,131 | Cheli | Nov. 15, 1938 |
| 2,292,236 | Martin | Aug. 4, 1942 |
| 2,695,379 | Myers et al. | Nov. 23, 1954 |
| 2,715,703 | Schuck | Aug. 16, 1955 |
| 2,769,155 | Wimble | Oct. 30, 1956 |
| 2,771,588 | Schinski et al. | Nov. 20, 1956 |
| 2,817,824 | Albright | Dec. 24, 1957 |
| 2,884,495 | Frankel | Apr. 28, 1959 |
| 2,887,622 | Rayburn et al. | May 19, 1959 |
| 2,918,648 | Ludman et al. | Dec. 22, 1959 |